(12) United States Patent
Henry

(10) Patent No.: US 8,951,380 B2
(45) Date of Patent: Feb. 10, 2015

(54) FABRIC WELDING MACHINE

(71) Applicant: Miller Weldmaster Corporation, Navarre, OH (US)

(72) Inventor: Brian D. Henry, North Lawrence, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 120 days.

(21) Appl. No.: 13/870,408

(22) Filed: Apr. 25, 2013

(65) Prior Publication Data

US 2013/0233483 A1 Sep. 12, 2013

Related U.S. Application Data

(63) Continuation of application No. 13/590,235, filed on Aug. 21, 2012, now Pat. No. 8,453,701, which is a continuation of application No. 12/577,539, filed on Oct. 12, 2009, now Pat. No. 8,272,420.

(51) Int. Cl.
| | |
|---|---|
| *B23P 19/04* | (2006.01) |
| *B29C 65/10* | (2006.01) |
| *B29C 65/20* | (2006.01) |
| *B29C 65/00* | (2006.01) |
| *B32B 37/02* | (2006.01) |

(52) U.S. Cl.
CPC .............. *B23P 19/04* (2013.01); *B29C 65/103* (2013.01); *B29C 65/20* (2013.01); *B29C 66/1122* (2013.01); *B29C 66/43* (2013.01); *B29C 66/4322* (2013.01); *B29C 66/49* (2013.01); *B29C 66/729* (2013.01); *B29C 66/83413* (2013.01); *B29C 66/845* (2013.01); *B32B 37/02* (2013.01); *B29C 66/71* (2013.01); *B29C 66/919* (2013.01); *B29C 66/93451* (2013.01); *B29C 66/9141* (2013.01); *B29C 66/91421* (2013.01)
USPC .......................... 156/308.4; 156/322; 156/324

(58) Field of Classification Search
CPC .. B29C 65/103; B29C 66/1122; B29C 66/43; B29C 66/4322; B29C 66/49; B29C 66/83413; B29C 66/845; B23P 19/04
USPC ............. 156/157, 304.6, 308.2, 308.4, 309.6, 156/322, 324, 497, 499, 502, 507, 544, 545, 156/546, 555, 582
See application file for complete search history.

(56) References Cited

U.S. PATENT DOCUMENTS

| | | | |
|---|---|---|---|
| 2,444,335 | A | 6/1948 | Coppock |
| 4,608,114 | A | 8/1986 | Nakao |
| 5,295,452 | A | 3/1994 | Frye et al. |
| 6,129,809 | A | 10/2000 | Ellenberger et al. |
| 6,668,696 | B1 | 12/2003 | Krohmer et al. |
| 6,701,991 | B2 | 3/2004 | Seo |
| 8,272,420 | B2 | 9/2012 | Henry |
| 2008/0308234 | A1 | 12/2008 | Seo |

*Primary Examiner* — John Goff
(74) *Attorney, Agent, or Firm* — Sand & Sebolt

(57) ABSTRACT

Methods and other embodiments associated with a fabric welding machine are presented. The fabric welding machine includes a base, a welding machine body, and a support beam with a first end and a second end. A first roller is positioned adjacent to the first end of the support beam opposite the welding machine body. A swing arm with a body end and a roller end is attached to the welding machine body. The roller end is opposite the welding machine body and is configured to move to a first position and a second position. A heat element attached to the first end of the support beam.

20 Claims, 19 Drawing Sheets

FABRIC WELDING MACHINE

CROSS REFERENCE TO RELATED APPLICATION

This application is a continuation of U.S. patent application Ser. No. 13/590,235, filed Aug. 21, 2012 now U.S. Pat. No. 8,453,701, which is a continuation of U.S. patent application Ser. No. 12/577,539, filed Oct. 12, 2009 (now U.S. Pat. No. 8,272,420); the disclosures of which are incorporated herein by reference.

BACKGROUND

1. Technical Field

The present invention relates generally to seaming machines. More particularly, the invention relates to a seaming machine and method of producing a seaming machine. Specifically, the invention relates to a seaming machine with a swing arm that is configured to be positioned in a plurality of positions and that has a detachable fabric table.

2. Background Information

A larger sheet of material is created by joining two sheets of material together at their seams. Typically, a first segment of sheet material is laid on a table or other work surface and a second segment of sheet material is positioned above the first segment with their edges generally aligned so that a seaming device moves along the aligned edges to form a seam along the length of the two sheet segments. This typically results in a two-segment sheet which is roughly twice as large as each of the individual segments. In order to form larger sheets of material, additional segments of sheet material must be sequentially seamed together. This seaming process may be achieved by various seaming devices depending on the material from which the sheets are formed and the application for which the product will be used. For example, seams may be formed using plastic welders, ultrasonic welders, radio frequency (RF) welders, adhesive or glue seaming devices or sewing devices amongst others.

As will be appreciated, the larger the sheet becomes, the more unwieldy it is to handle. The standard practice for adding one or more additional segments of sheet material to the two-segment sheet is to slide one of the sheet segments off of a table or work surface and move the non-seamed edge of the other sheet segment adjacent the side of the table along which the seaming device is positioned. Especially during the formation of larger sheets of material such as relatively heavy tarps, the movement of these sheet segments and re-positioning thereof can be difficult for a single operator of the seaming device. Once the non-seamed edge of the second segment of sheet material is properly positioned, a third segment of sheet material is positioned adjacent the second segment and the edges of the second and third segments are then seamed together.

A table or work surface may be helpful to manipulated sheets of material seamed to produce a generally flat result. However, sliding material on a seaming machine table may make it difficult to produce cylindrical, elliptical, oval, spherical, and other curved shapes. Additionally, after each segment of sheet material is seamed to the previous one, additional sheet material must be moved off of the table or work surface and gradually piles up on the floor, often in disarray. Furthermore, material hanging off of the table or an elevated work surface pulls on the material atop the table and adds to the difficulty of aligning the material for a subsequent seaming operation. In short, the process is relatively time consuming and labor intensive. A better way of joining fabric is desired.

BRIEF SUMMARY OF THE INVENTION

In one aspect, the invention may provide method comprising the steps of: providing a welding machine comprising a welding machine body, a welding arm with an end extending away from the welding machine body, a first roller rotatably mounted on the welding arm end, a swing arm pivotally attached to the welding machine body, a second roller rotatably mounted on the swing arm adjacent the first roller, a bracket attached to the swing arm, and a heat system; moving the swing arm pivotally to a first position; mounting the swing arm in the first position by connecting the bracket to the welding machine body at a first location so that the welding machine is configured to weld fabric with the heat system and rollers while the swing arm is mounted in the first position; disconnecting the bracket from the first location; moving the swing arm pivotally to a second position; mounting the swing arm in the second position by connecting the bracket to the welding machine body at a second location so that the welding machine is configured to weld fabric with the heat system and rollers while the swing arm is mounted in the second position and the bracket is disconnected from the first location.

In another aspect, the invention may provide a method comprising the steps of: providing a welding machine comprising a welding machine body, a welding arm with an end extending away from the welding machine body, a first roller rotatably mounted on the welding arm end, a swing arm pivotally attached to the welding machine body to pivot about an axis, a second roller rotatably mounted on the swing arm adjacent the first roller, and a heat system; wherein the swing arm is U-shaped and comprises a first arm, a second arm and a middle portion which extends from the first arm to the second arm so that the first and second arms form sides of the U-shape and the middle portion forms a bottom of the U-shape; the first arm has a first end adjacent the axis and a second end distal the axis; the second arm has a first end adjacent the axis and a second end distal the axis; and the middle portion extends from adjacent the second end of the first arm to adjacent the second end of the second arm; moving the swing arm pivotally about the axis to a first position so that the welding machine is configured to weld fabric with the heat system and rollers while the swing arm is in the first position; and moving the swing arm pivotally about the axis to a second position so that the welding machine is configured to weld fabric with the heat system and rollers while the swing arm is in the second position.

In another aspect, the invention may provide a method comprising the steps of: providing a welding machine comprising a welding machine body, a welding arm with an end extending away from the welding machine body, a first roller rotatably mounted on the welding arm end, a swing arm pivotally attached to the welding machine body, a second roller rotatably mounted on the swing arm adjacent the first roller, and a heat system; moving the swing arm pivotally to a first position; attaching a fabric table to the machine body while the swing arm is in the first position so that the welding machine is configured to weld fabric with the heat system and rollers while the swing arm is in the first position and the fabric table is attached to the machine body; detaching the fabric table from the machine body; and moving the swing arm pivotally to a second position so that the welding machine is configured to weld fabric with the heat system and rollers while the swing arm is in the second position and the fabric table is detached from the machine body.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE INVENTION

Figure 1:
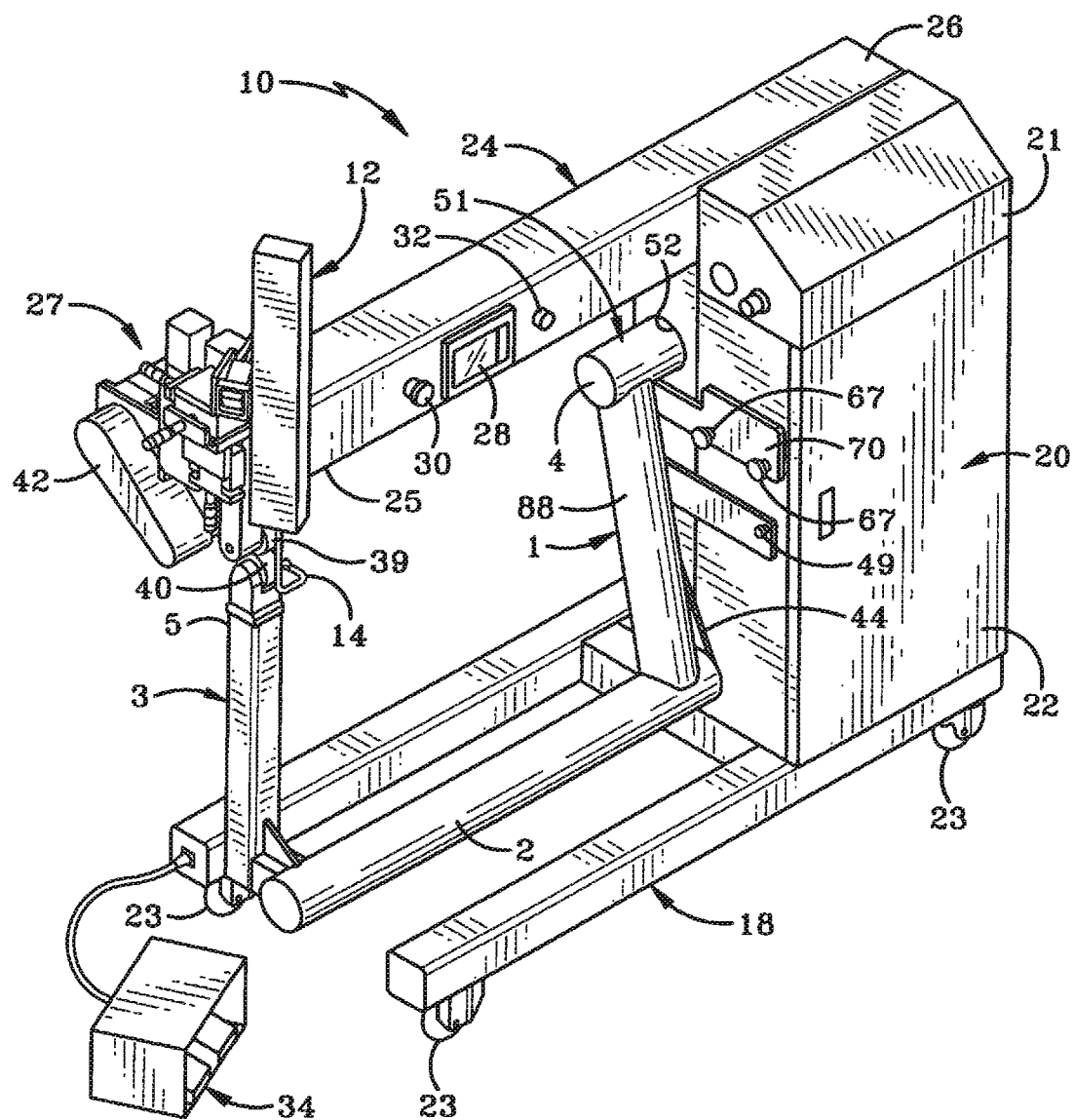
FIG. 1 illustrates a perspective view of an embodiment of a fabric welding machine used to weld two fabrics together.
Figure 15:
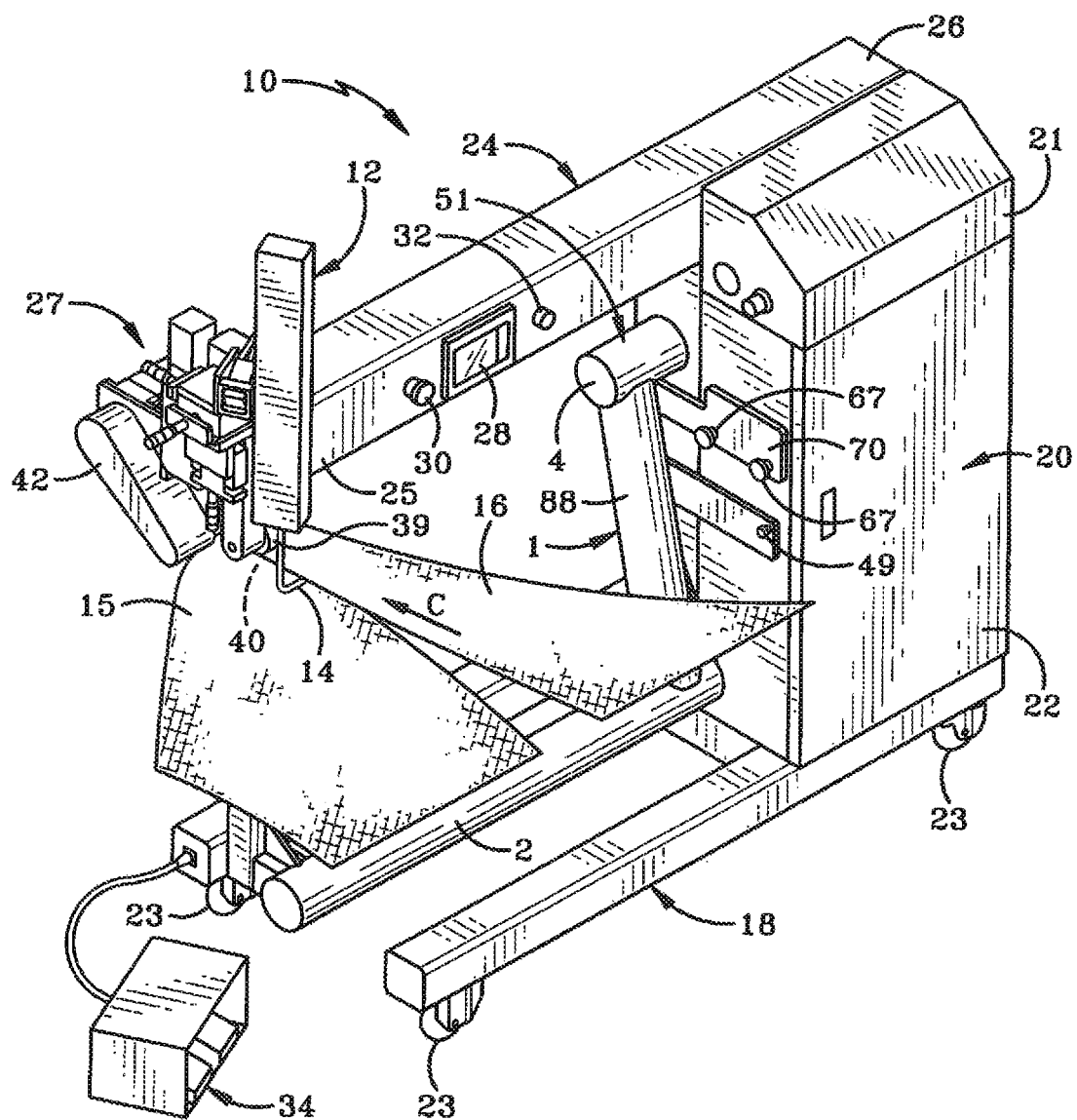
FIG. 15 illustrates a perspective view of an embodiment of a fabric welding machine without a fabric table attached to the fabric welding machine showing the fabric welding machine in operation with the post arm in a vertical position.

FIG. 1 illustrates a preferred embodiment of a welding machine 10 used to weld together two pieces of fabric. In the preferred embodiment, the welding machine 10 is configured with either a hot air 12 or a hot wedge heating system. These heating systems generate and apply heat to the seams of two pieces of fabric 15, 16 to connect the two pieces of fabric 15, 16 together as they are moved in direction "C" as shown in FIG. 15. In the preferred embodiment, a hot wedge heating system is configured to produce heat up to 450 degrees Celsius and a hot air heating system 12 is configured to produce heat up to 750 degrees Celsius. The figures illustrate a welding machine 10 with a hot air heating system 12 that applies heated hot air through a nozzle 14, however, a hot wedge or other welding device could be attached to the welding machine 10. The welding machine 10 is capable of welding a variety of materials including polyvinyl chloride (PVC), polyurethane (PU), polyolefins (PEs), as well as many other materials.

Figure 16:
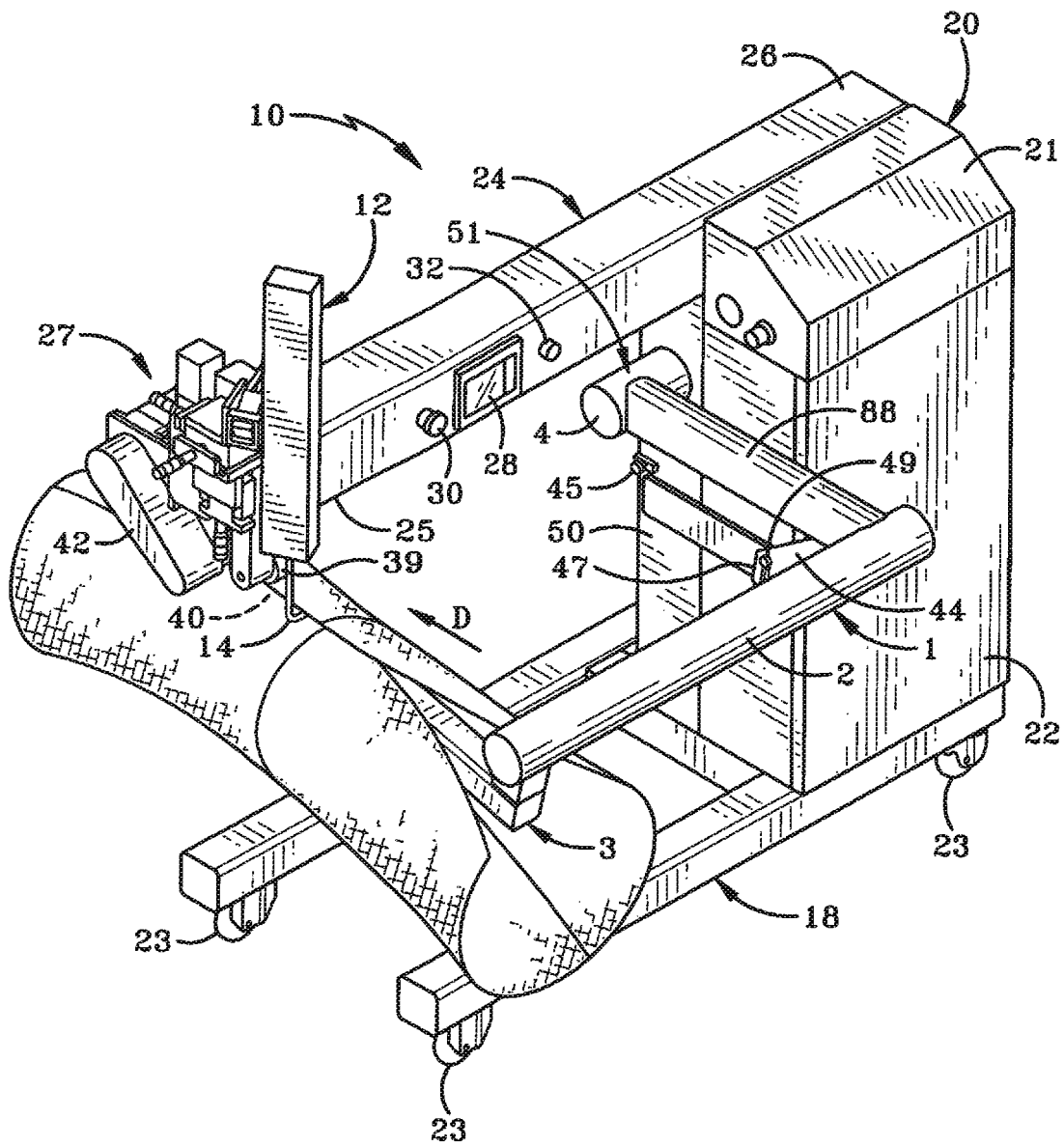
FIG. 16 illustrates a perspective view of an embodiment of a fabric welding machine without a fabric table attached to the fabric welding machine showing the fabric welding machine in operation with a post arm in a horizontal position.

Before describing the figures in detail, the figures are introduced that highlight why the welding machine 10 is an improvement over traditional welding machines for a variety of reasons. For example, FIG. 1 shows the welding machine 10 includes a swing arm 1 that can be positioned in at least two different positions. The swing arm 1 may be U-shaped with a roller end 5 and a body end 4. The details of the shape of the swing arm 1 will be discussed in detail later with respect to FIGS. 3 and 4. In one embodiment, the roller end 5 may be the end of a post arm 3 of the swing arm 1. A roller may be attached at the roller end 5. FIGS. 1, 3 and 13-15 show the post arm 3 positioned in a vertical position. FIGS. 4, 5, 8 and 16 show the post arm 3 rotated in a direction "A" to reconfigure the swing arm 1 to a horizontal position. Positioning the post arm 3 in a vertical position may facilitate the welding of sheets of material as shown in FIG. 15. Positioning the post arm 3 in a horizontal position may facilitate the welding of conical sections of fabric as the fabric is moved in direction "D" as shown in FIG. 16.

Figure 14:
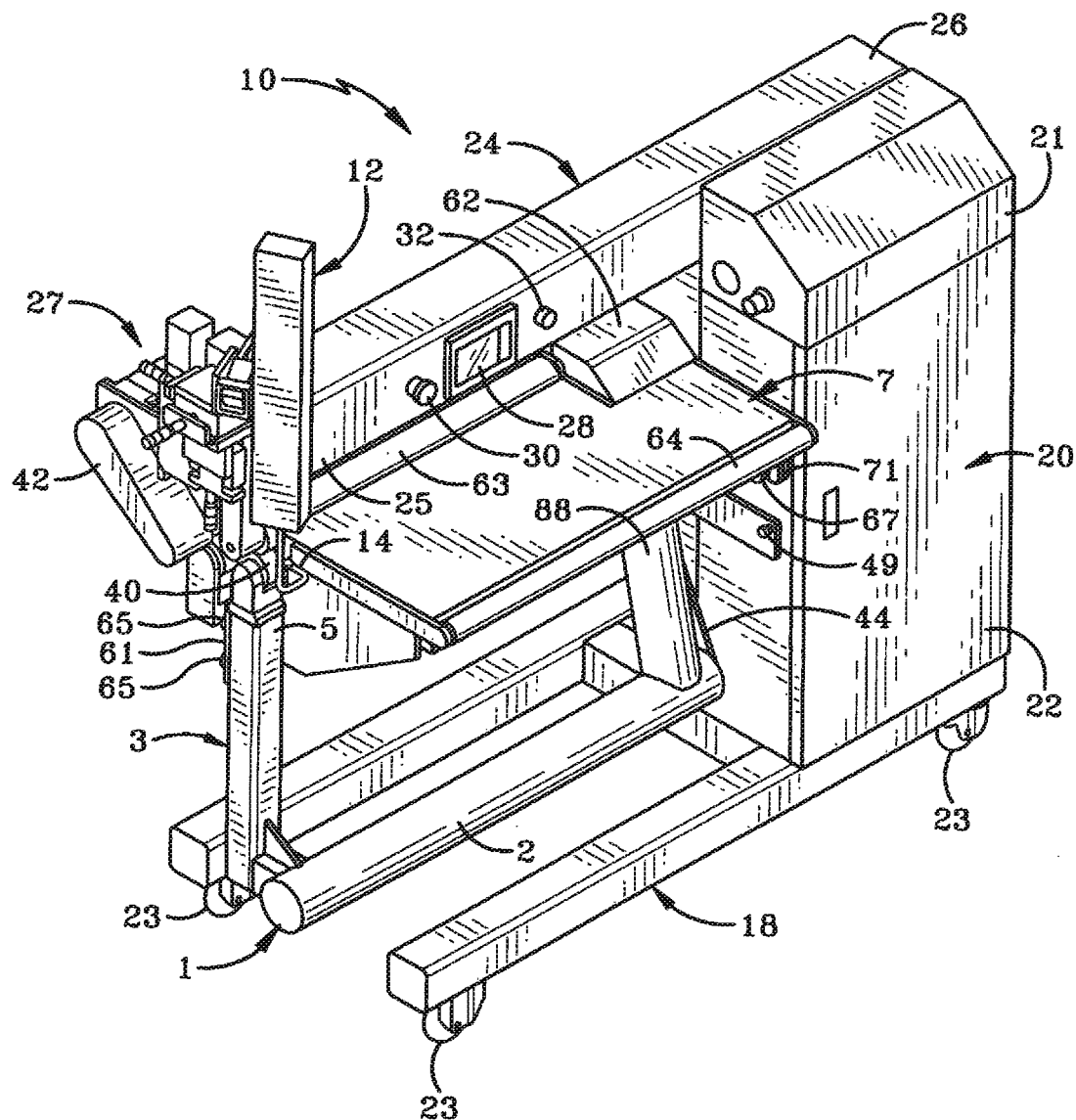
FIG. 14 illustrates a perspective view of an embodiment of a fabric welding machine with a fabric table attached to the fabric welding machine.
Figure 17:
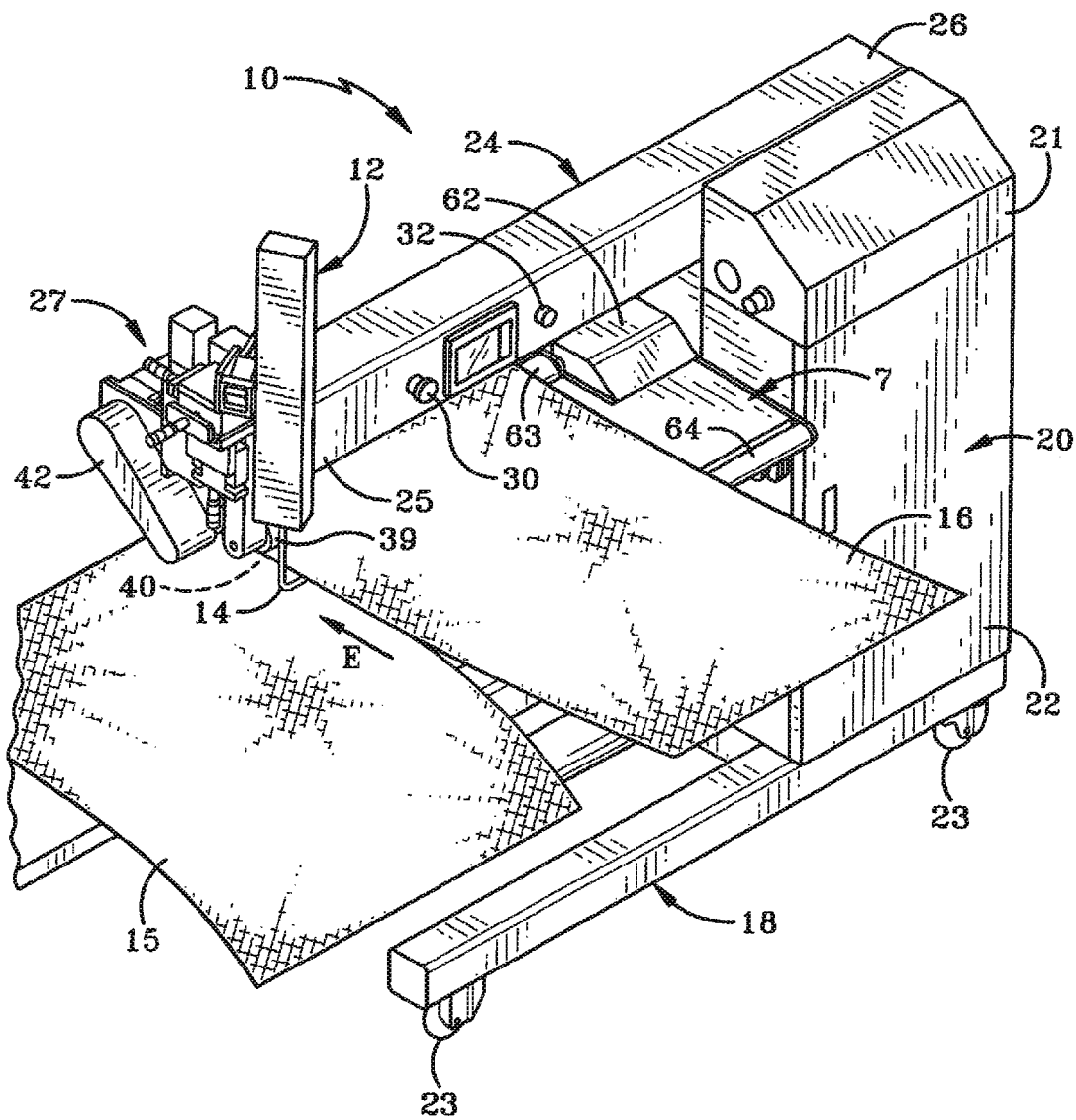
FIG. 17 illustrates a perspective view of an embodiment of a fabric welding machine with a fabric table attached to the fabric welding machine showing the fabric welding machine in operation.
Figure 18:
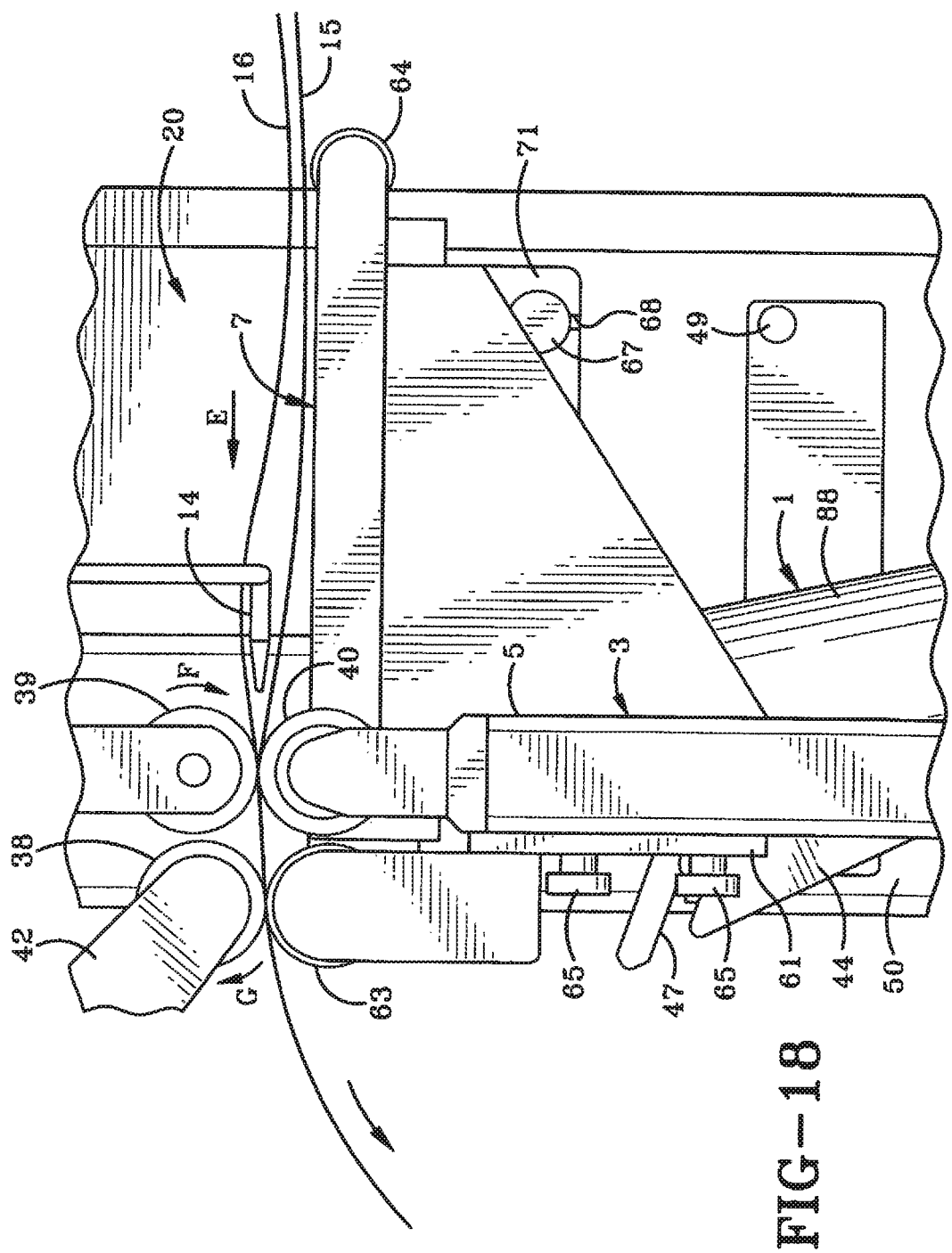
FIG. 18 illustrates a side view of an embodiment of a fabric welding machine with a fabric table attached to the fabric welding machine showing fabric passing between rollers.

In the preferred embodiment, a fabric table 7 may be easily attached to and removed from the welding machine 10. FIG. 14 shows the fabric table 7 attached to the welding machine 10 when the post arm 3 of the swing arm 1 is in a vertical position. FIGS. 17 and 18 illustrate how the fabric table 7 aids in the welding of two sheets of fabric 15, 16 when the fabric 15, 16 is moved in direction "E". In another embodiment, a second table may be attached to or positioned near the rear of the welding machine 10 to receive fabric that has been welded by the welding machine 10. The fabric table 7 is generally used to produce straight seams for produces such as tarps, awning and tents; while the swing arm 1 is generally used to form curves and unique shapes for products like boats and inflatables.

Figure 3:
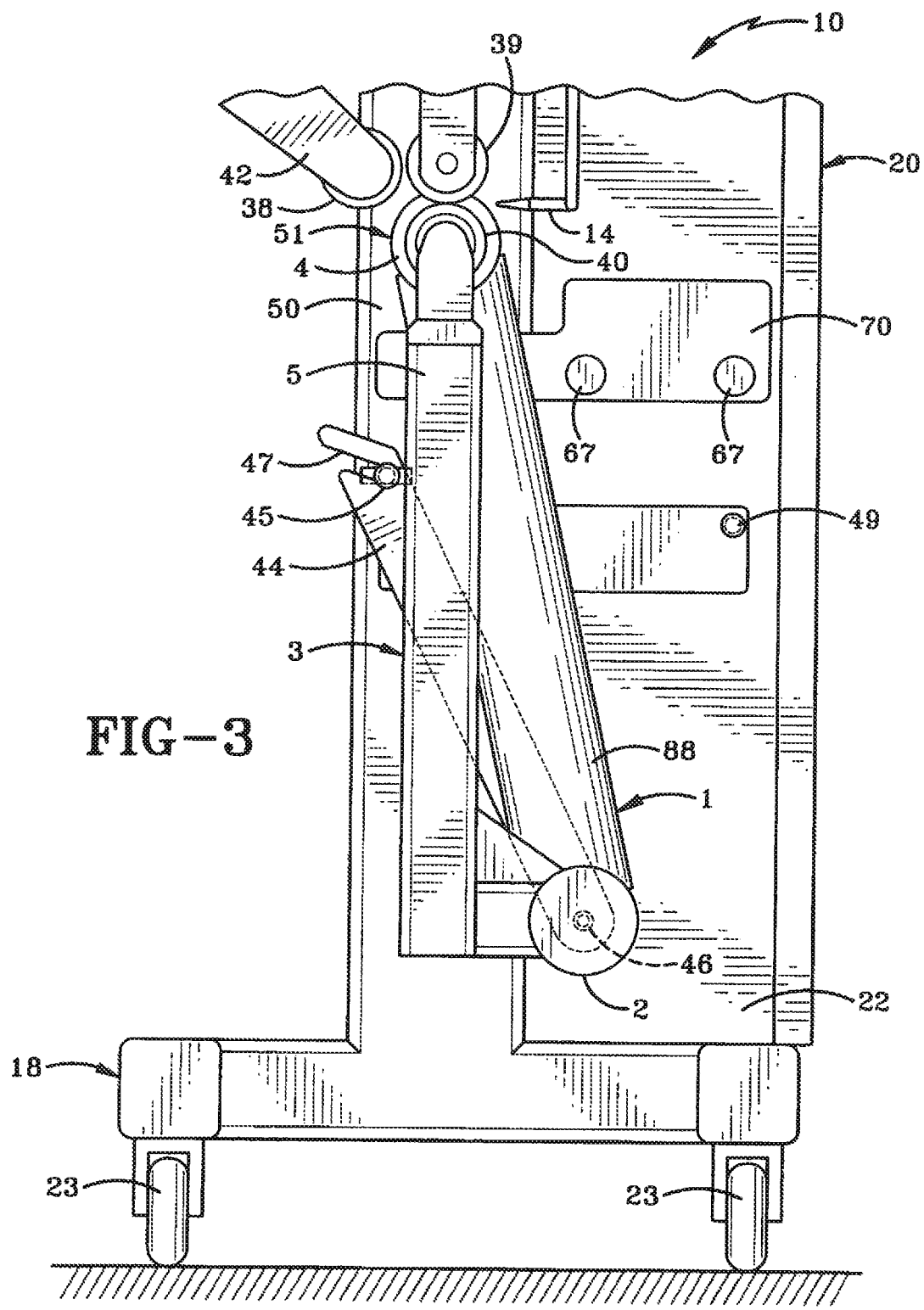
Figure 4:
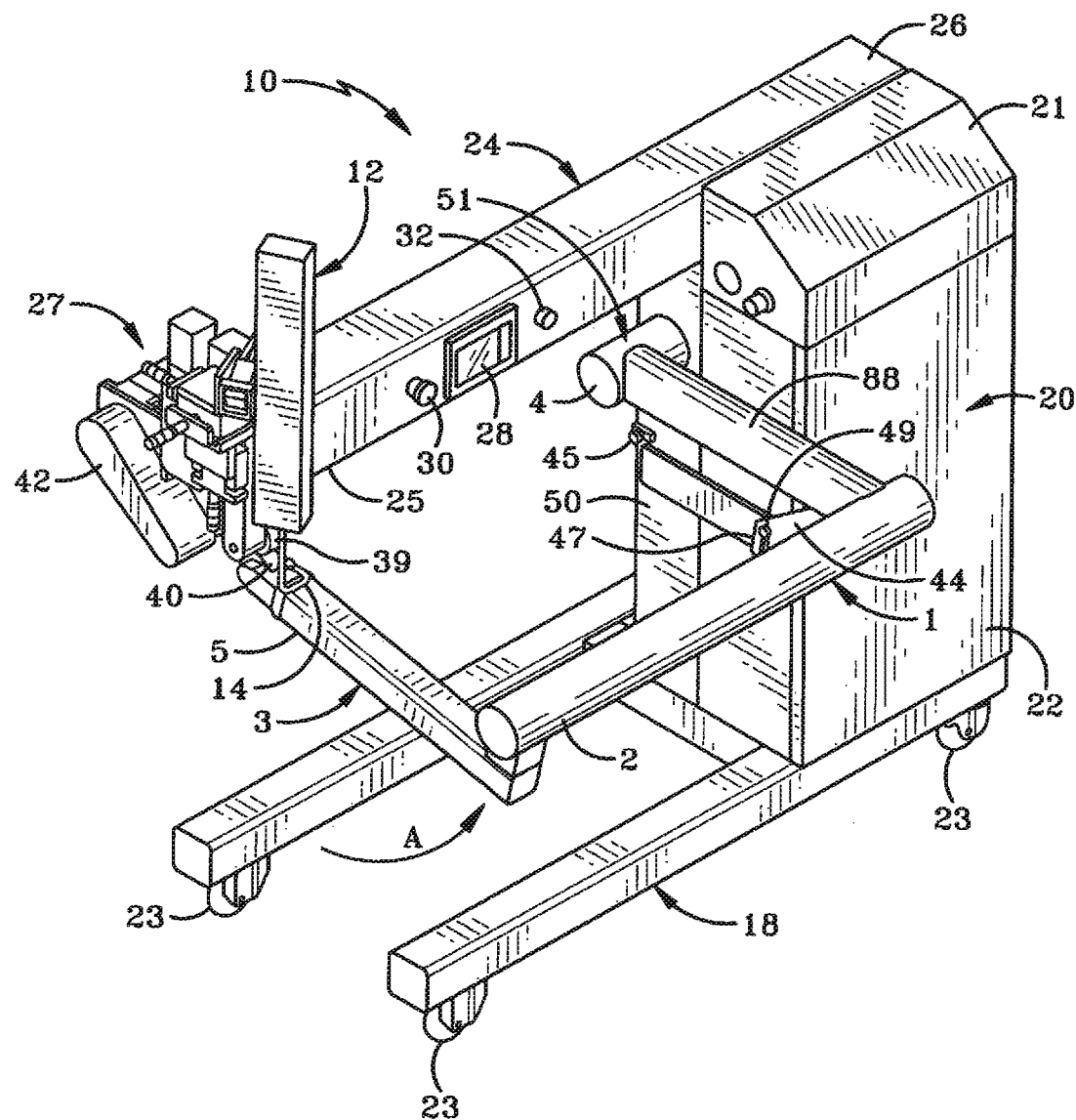
FIG. 4 illustrates a perspective side view of an embodiment of fabric welding machine with a post arm in a horizontal position.

As previously mentioned, the swing arm 1, is generally U-shaped as shown in FIG. 4. The post arm 3 and a first arm 88 of the swing arm 1 form the side of the U-shape and a middle portion 2 of the swing arm 1 forms the bottom of the U-shape. The post arm 3 and first arm 88 are parallel each other but pointing in two slightly different directions. When the middle portion 2 is in a lowered position, the post arm is in a vertical position as best seen in FIG. 3. In this position, the first arm 88 is generally vertical but can be seen at a significantly different angle than the post arm 3. This is because the post arm 3 is connected to the middle portion 2 with a spacing member while the first arm 88 is connected to the middle portion 2 without a spacing member.

A U-shaped swing arm 1 that is also movable allows for a variety of materials to welding by the welding machine. For example, when the post arm 3 is vertical and the fabric table is not attached, the welding machine 10 can weld round shaped fabric that can be draped over the top of the post arm 3 as shown in FIG. 16. The U-shape provides an open area where fabric and/or an operator of the fabric machine may be positioned at during welding operations. When the post arm is horizontal and the fabric table is not attached, fabric can be draped over the middle portion 2 while fabric is being welded. This configuration may also be useful for welding cylindrical shapes as shown in FIG. 16. As previously mentioned, when the fabric table 7 is attached, the fabric table is useful to produce straight flat seams.

Returning to FIG. 1, this figure shows the welding machine 10 includes base 18, a welding machine body 20 with a top 21 and a bottom 22. The bottom 22 of the welding machine body 20 is attached to one end of the base 18. The base 18 may include wheels 23 to allow the welding machine 10 to be moved to different locations. The welding machine 10 includes a support beam 24 with a first end 25 and a second end 26. The second 6 end is attached to the top 21 of the welding machine body 20.

In general, the base 18, welding machine body 20 and the support beam 24 form a frame of the welding machine 10. In this preferred embodiment, this frame is connected together to form a rigid steel frame. The swing arm 1 may also be fabricated out of steel components to ensure the welding machine 10 is solid and durable. The swing arm 1 may be partially fabricated out of steel tubular sections of pipe. The post arm 3 section of the swing arm 1 may be fabricated out of an elongated section of steel with a rectangular cross-section.

In the preferred embodiment, the welding machine 10 includes a control system with a graphical user interface (GUI) 28. The GUI 28 is positioned in the support beam 24 to allow an operator of the welding machine 10 to easily see and enter values into the GUI 28. The GUI 28 allows an operator of the welding machine 10 to select a temperature of the heating system 12, select a roller speed of rollers used to pull fabric through the welding machine 10, as well as other settings. The control system can store parameter settings for multiple configurations of the welding machine 10 so that the parameters do not need to be completely re-entered each time a particular configuration is needed. The GUI 28 may present prompts in one of several different languages that is selected by an operator. An emergency stop button 30 and a power on/off button 32 may be located adjacent the GUI 28. One or more foot peddles 34 may be attached to the welding machine 10 to allow an operator to control when heat is applied or when rollers are driven to propel fabric through the welding machine 10.

Figure 13:
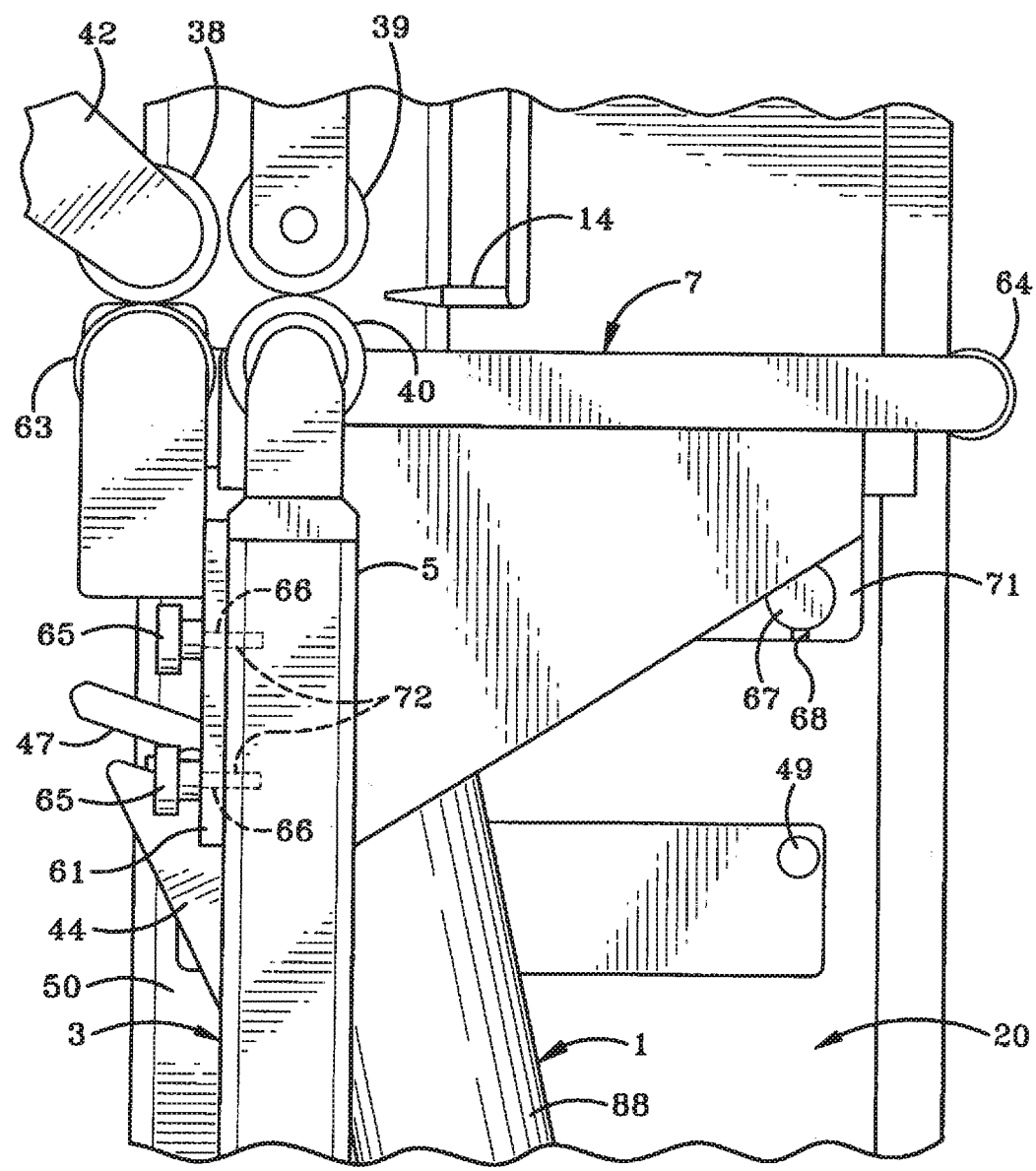
FIG. 13 illustrates a detailed side view of an embodiment of a fabric welding machine with a fabric table attached to the fabric welding machine.

Adjacent the heat system 12 and also mounted on the first end 25 of the support beam 24 are two rollers 38, 39 that are best seen in FIG. 13. One or both rollers 38, 39 may be driven by a roller driver 42. The roller driver 42 will drive the rollers so that fabric can be processed through the welding machine 10 at a rate of up to 50 meters per minute. As previously mentioned, an operator can set the roller speed through GUI 28. A variety of adjustment devices 27 are also mounted on the support beam 24 to facilitate an operator in adjusting the positioning of the rollers 38, 39 and in adjusting how much pressure the rollers 38, 39 exert on each other. The adjustment devices also facilitate an operator in controlling how much pressure is applied to fabric moving between roller 39 and a roller 40 mounted to the roller end 5 of the swing arm 1.

The first end 25 of the support beam 24 is also configured to be fitted with various guides (not shown) to assist an operator of the welding machine 10 with aligning two sheets of material to be welded together. The different guides can assist an operator with making a variety of specific seams. For example, the welding machine 10 is configured to be fitted with guides to create weld hems, overlaps, hem with rope, hem with pocket, as well as other seams.

Figure 2:
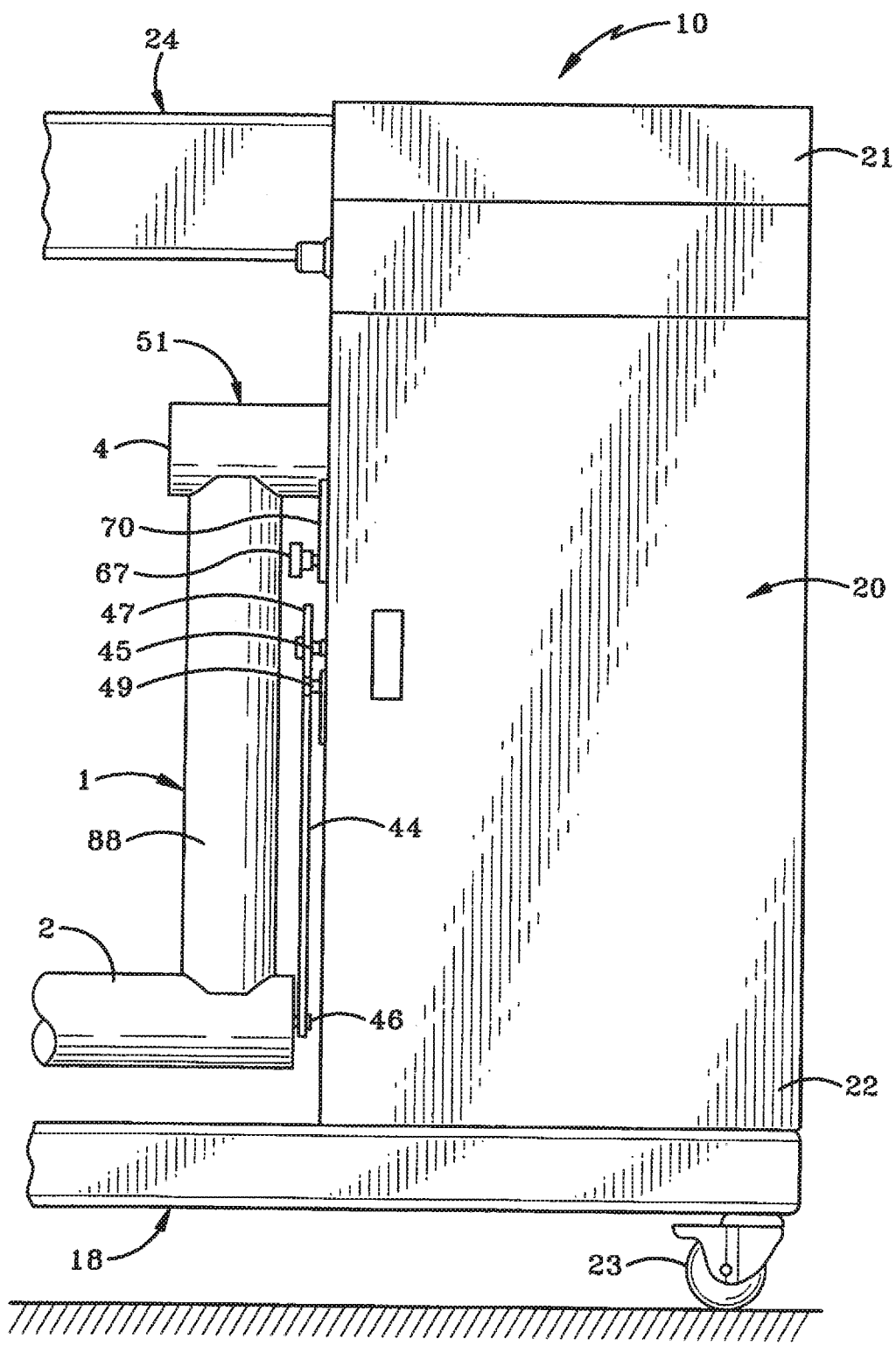
FIGS. 2 and 3 illustrate side views of an embodiment of a fabric welding machine with a post arm in a vertical position.
Figure 5:
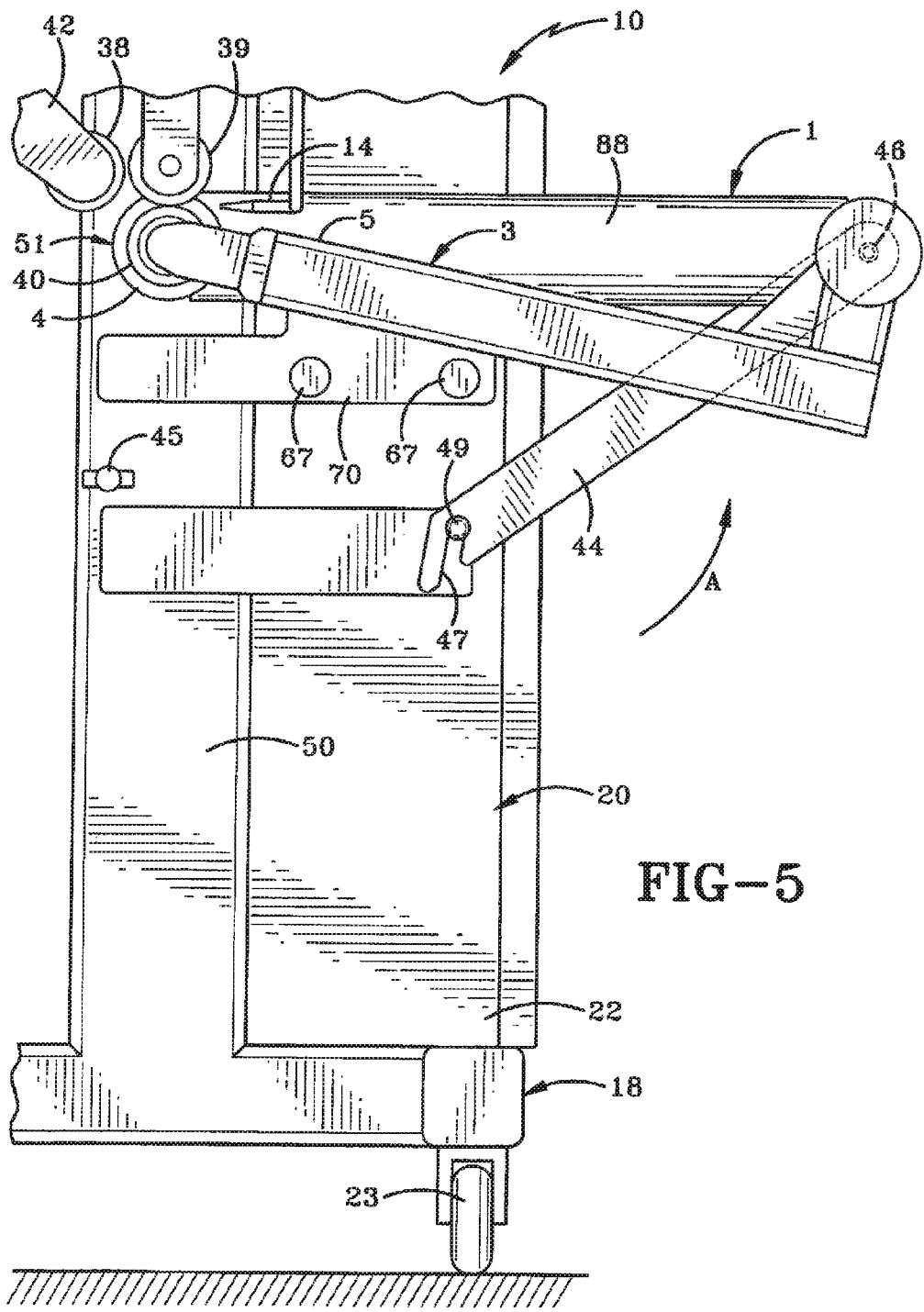
FIGS. 5 and 6 illustrate side views of an embodiment of a fabric welding machine with a post arm in a horizontal position.
Figure 6:
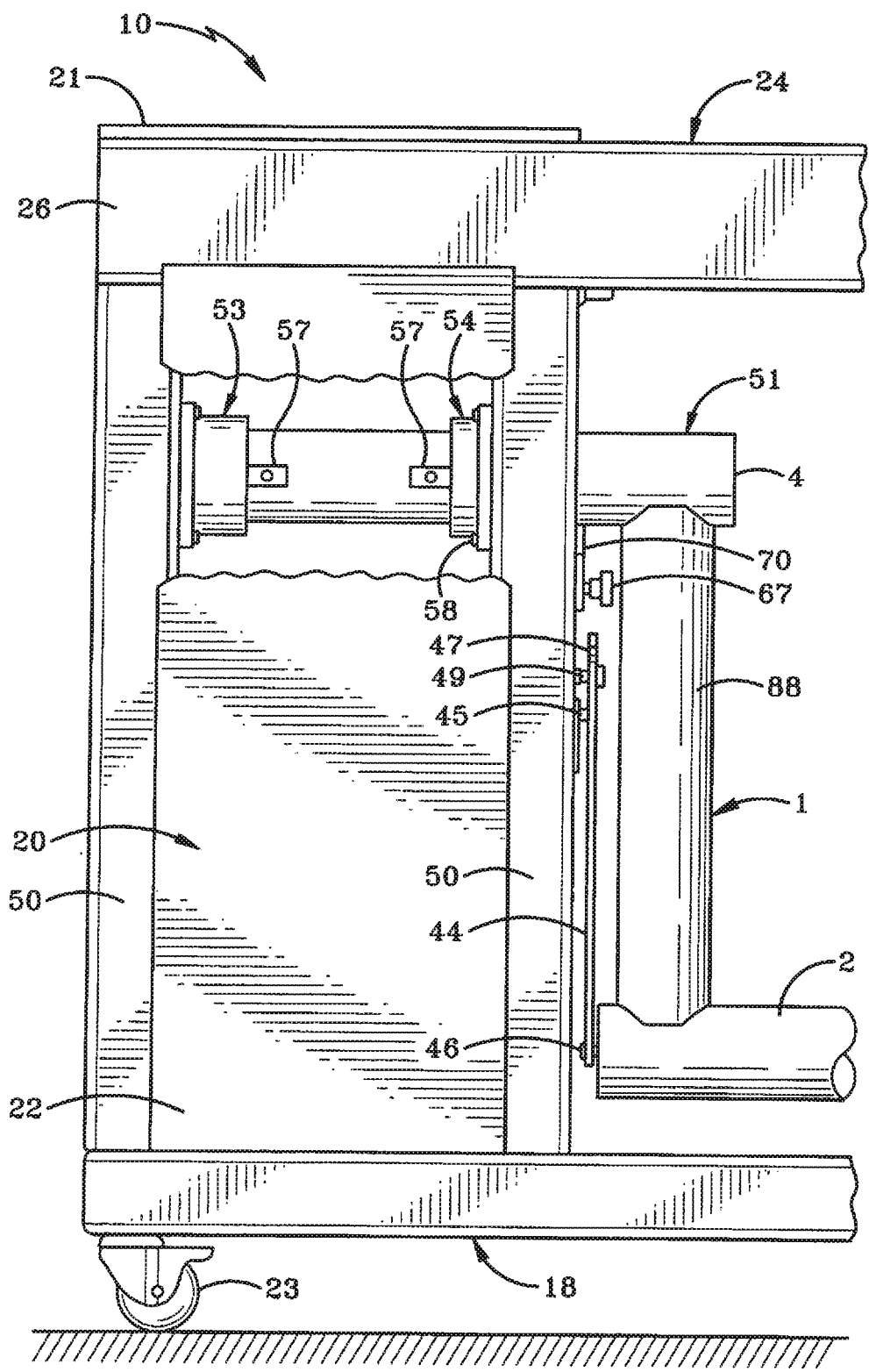

FIGS. 2 and 3 illustrate the welding machine 10 configured with the middle portion 2 of the swing arm 1 in down position so that the post arm 3 of the swing arm 1 is in a vertical position. A bracket 44 is pivotally attached by a pin fastener 46 to the end of the middle portion 2 adjacent the welding machine body 20. The welding machine 10 is configured to allow the post arm 3 to be mounted in a vertical position by attaching a grooved end 47 of the bracket 44 to a first knob 45 mounted on the welding machine body 20. The welding machine 10 is further configured to allow the post arm 3 to be mounted in a horizontal position by attaching a grooved end 47 of the bracket 44 to a second knob 49 mounted on the welding machine body 20 as shown in FIGS. 4 and 5. Notice the second knob 49 has a lower profile than the first knob 45 to allow the bracket to pass over the second knob 49.

Figure 7:
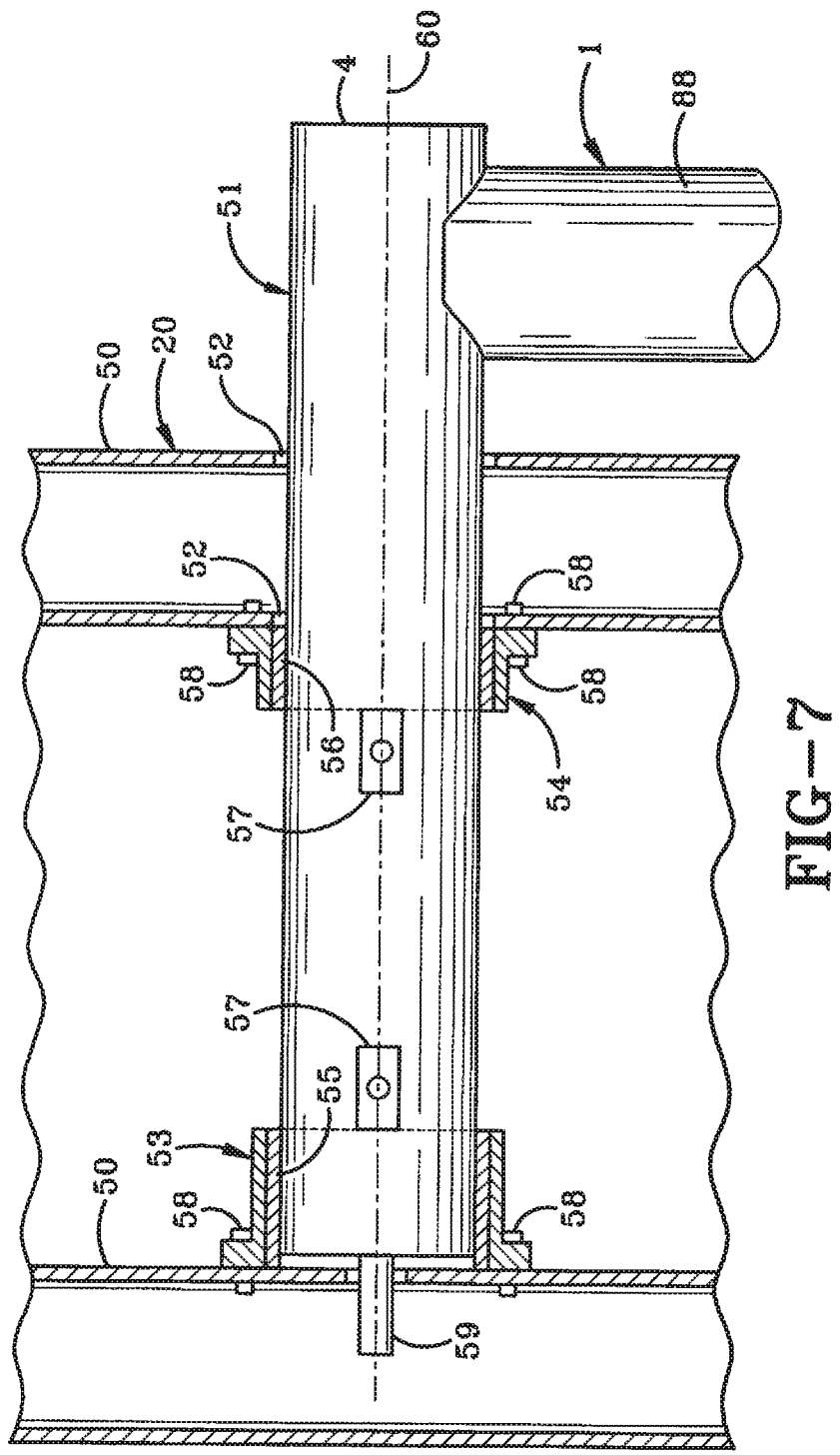
FIG. 7 illustrates a cross-sectional view of an embodiment of a fabric welding machine.
Figure 8:
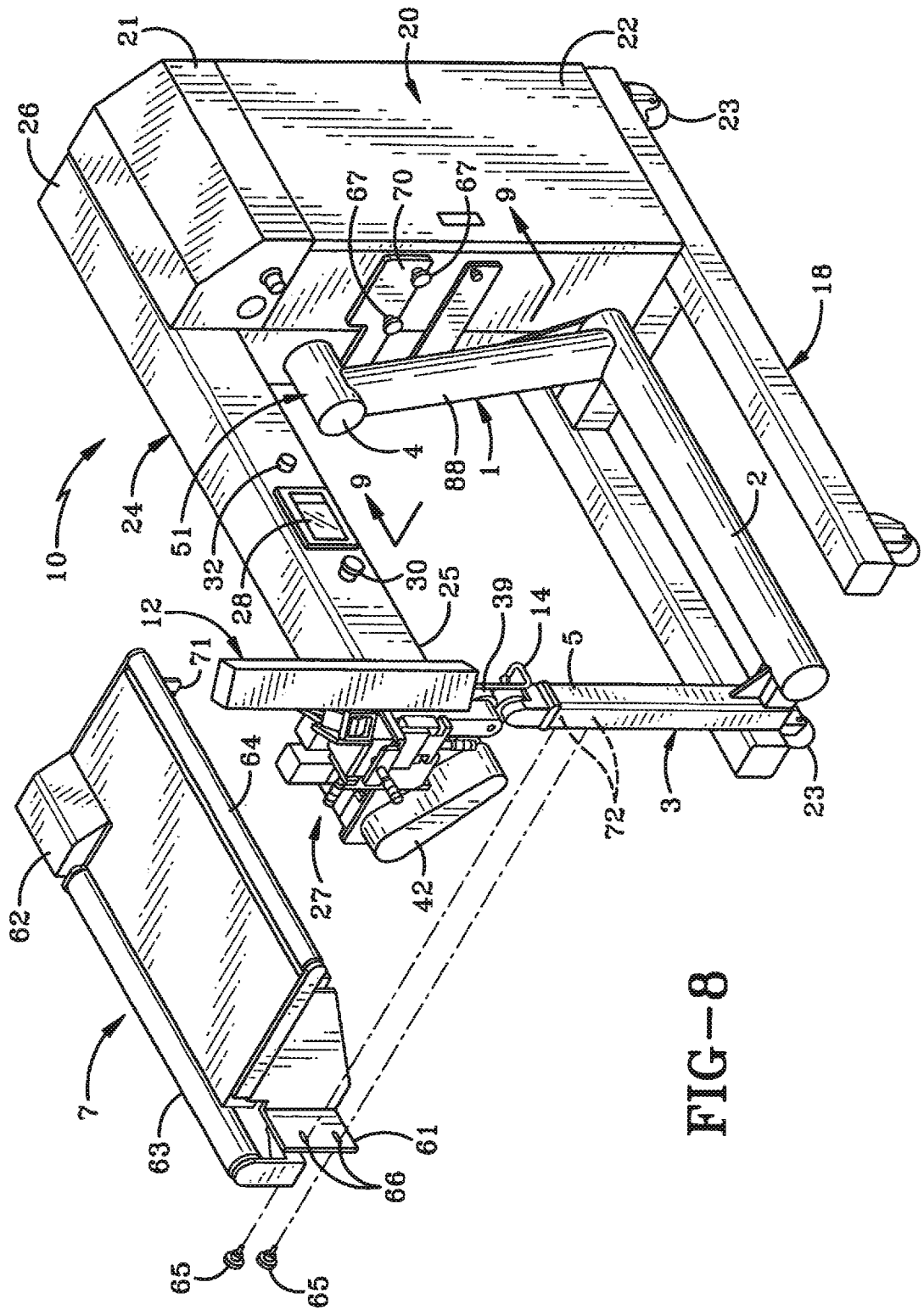
FIG. 8 illustrates an exploded view of an embodiment of a fabric welding machine with a fabric table being attached to the fabric welding machine.
Figure 9:
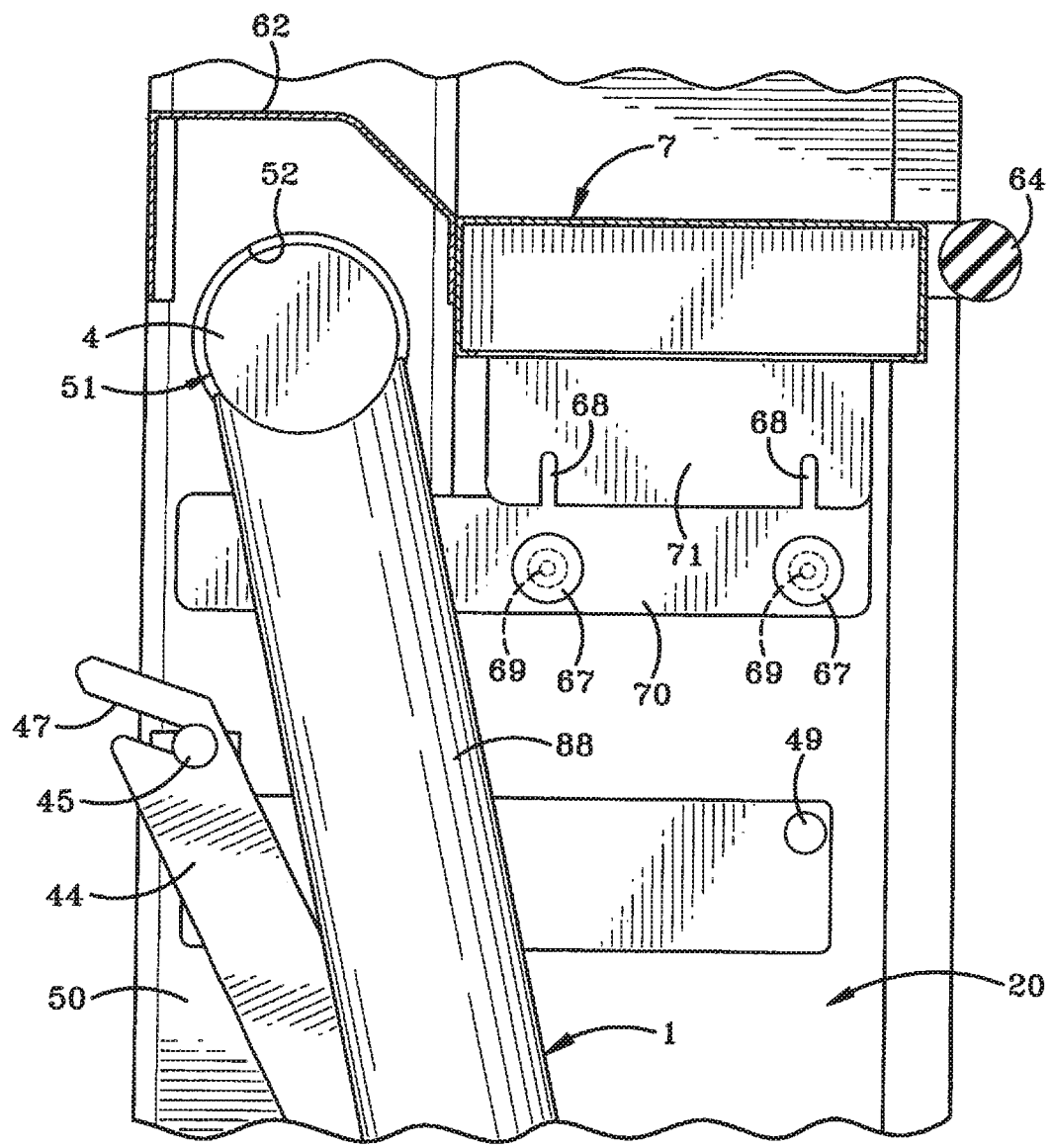
FIG. 9 illustrates a side view of an embodiment of a fabric welding machine with a fabric table being attached to the fabric welding machine.
Figure 10:
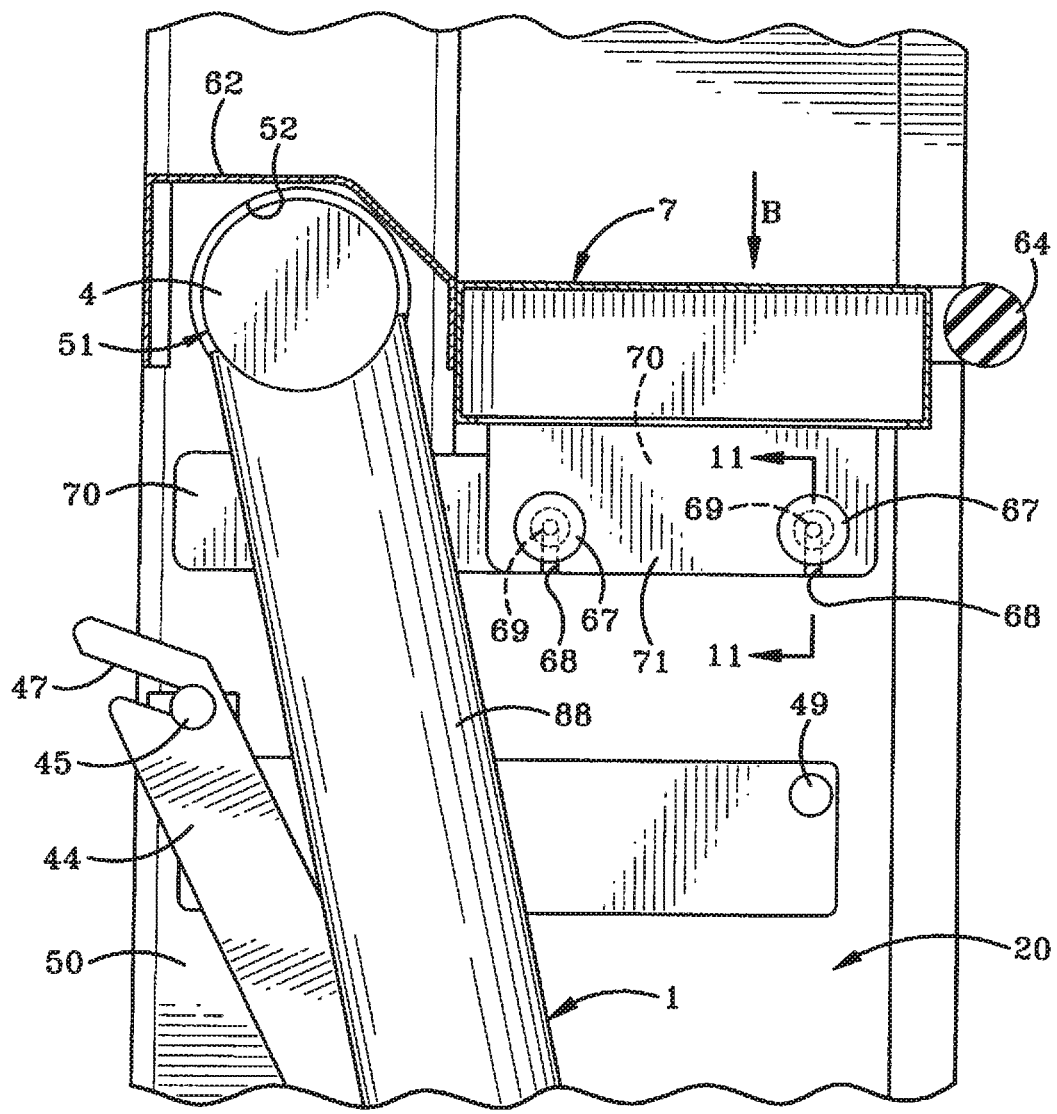
FIG. 10 illustrates a side view of an embodiment of a fabric welding machine with a fabric table attached to the fabric welding machine.

FIG. 7 illustrates how in the preferred embodiment the swing arm 1 is mounted to the welding machine body 20. A pipe attachment portion 51 of the swing arm 1 is positioned through a hole 52 in side walls 50 and passes through a first bushing 53 and a second bushing 54. The first bushing 53 and the second bushing 54 may have different lengths and may each be lined with a bushing liner 55, 56. The bushing liners 55, 56 are formed with a material that allows the swing arm 1 to easily rotate within the first bushing 53 and the second bushing 54. The first busing 53 and the second bushing 54 attached to the side walls 50 with fasteners that may be bolts 58. Two stops 57 may be attached to the pipe attachment portion 52 to prevent the swing arm 1 from sliding out of or further into the welding machine body 20. The pipe attachment portion 52 may be configured with a rod 59 to facilitate the pivotal movement of the pipe attachment portion 52 around an axis 60. The side walls 50 may be formed with steel sections that are hollow in the middle.

Figure 11:
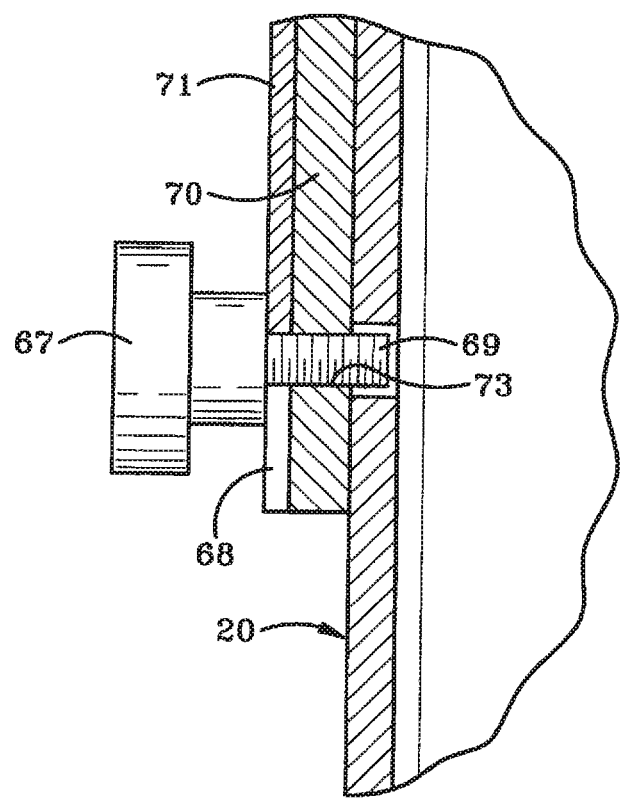
FIG. 11 illustrates a detailed cross-sectional side view of an embodiment of a fabric welding machine with a fabric table attached to the fabric welding machine.
Figure 12:
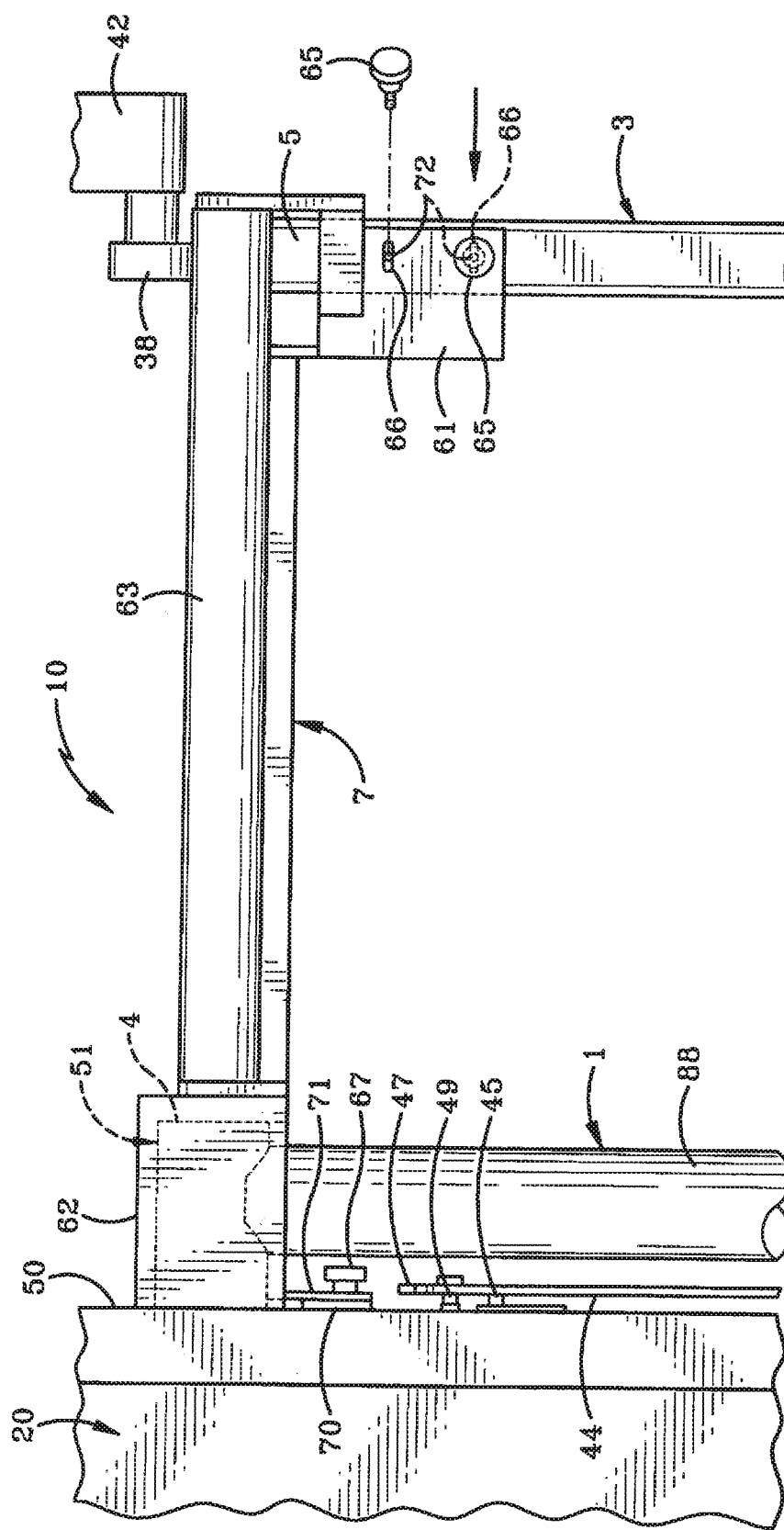
FIG. 12 illustrates a back view of an embodiment of a fabric welding machine with a fabric table attached to the fabric welding machine.

FIGS. 8-12 show how the fabric table 7 is attached to the welding machine 10. The fabric table 7 is attached to the post arm 3 of the swing arm 1 and the welding machine body 20 when the middle portion 2 of the swing arm 1 is in a lowered position. The fabric table 7 includes a rear roller 63 and a front roller 64 to aid the movement of fabric across the fabric table 7. An elevated portion 62 of the fabric table 7 allows the fabric table 7 to be fitted over the pipe attachment portion 51 of the swing arm 1. A mounting flange 61 with two screw holes 66 is mounted on one side of the fabric table 7 and a mounting flange 71 with two slots 68 is mounted to the other side of the fabric table 7. The fabric table 7 is configured to attach to the post arm 3 of the swing arm 1 by passing two screws 65 through two screw holes 66 in the mounting flange 61 and then attaching the screws 65 to the post arm 3. The screw holes 66 may be elongated in the horizontal position to aid in the aligning of the holes 66 with complementary threaded holes 72 in the post arm 3. The fabric table 7 is configured move in a downward direction "B" (see FIG. 10) so the fabric table 7 can be attached to the welding machine body 20 by sliding two slots 68 onto two knobs 67 (e.g., thumb screws)

that are mounted on the welding machine body 20. The knobs 67 may include a threaded portion 69 as shown in FIG. 11. The knobs 67 can be tightened after the fabric table 7 is resting on the loosened knobs 67. In the preferred embodiment, the knobs 67 may pass through a support plate 70 attached to the side of the welding machine body 20 and the knobs may be tightened in a threaded portion 73 of the support plate 70 to press the mounting flange 71 against the support plate 70.

FIG. 13 illustrates a detailed view of the rear roller 63 of the fabric table 7 and the other three rollers 38, 39, 40 when the fabric table 7 is attached to the welding machine 10. Fabric 15, 16, is initially pulled by rollers 39, 40 while the fabric is heated by the hot air nozzle 14. These rollers 39, 40 apply the correct pressure to the seam so that a strong seam is created between the two fabrics 16, 15. Rollers 42, 63 will continue to pull that fabric 15, 16 after the fabric has been welded. FIG. 18 shows how two sheets of fabric 15, 16 are passed through the welding machine 10 when the fabric table 7 is attached. This Figure also shows how the fabric 15, 16 is positioned when an overlapping joint between the two sheets of fabric 15, 16 is being created by moving the fabric 15, 16 in direction "E". In FIG. 18, roller 28 rotates as shown by direction "F" and roller 38 rotates as shown by direction "G".

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 19:
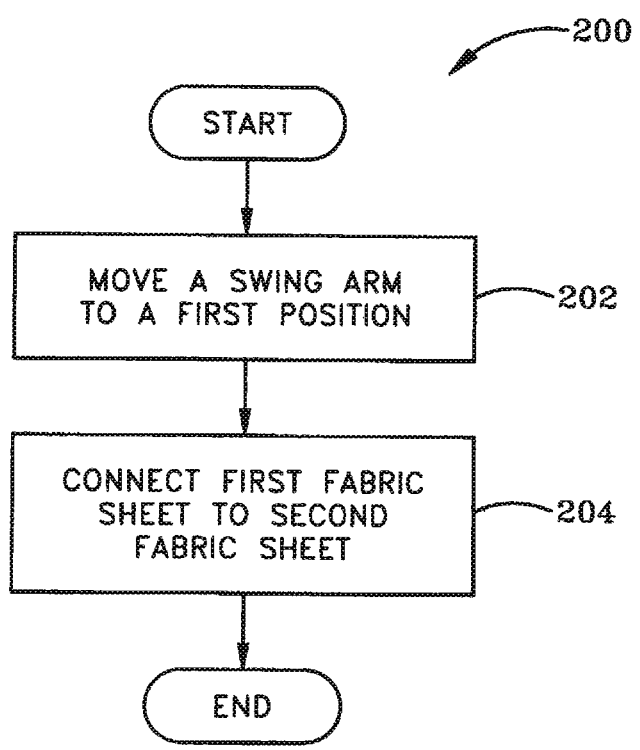
FIG. 19 illustrates an embodiment of a method associated with a fabric welding machine.

FIG. 19 illustrates an embodiment of a method 200 associated with operating a welding machine to weld a first fabric sheet to a second fabric sheet. As mentioned earlier, the welding machine may weld a variety of fabrics including a variety of polymers. For example, the machine may weld fabrics containing polyvinyl chloride (PVC), polyurethane (PU), polyolefins (PEs) and other polymers using a heat source. The method 200 begins, at 202, by moving a swing arm of the fabric welding machine to a first position. The swing arm is configured to be set up in a first position or a second position. The swing arm may be U-shaped and may be pivotally attached to the fabric welding machine. The fabric welding machine is then operated to connect a first fabric sheet to a second fabric sheet at 204.

In another embodiment, the method attaches a fabric table to the fabric welding machine. The fabric welding table has a flat surface that aids in the movement and positioning of fabric to be connected. The fabric table is attached to the fabric welding machine by sliding one or more grooves in the fabric table onto one or more knobs on the fabric welding machine. The fabric table is configured to attach to the swing arm by pushing one or more connectors through the fabric table and attaching the one or more connectors into the swing arm.

A person of ordinary skill in the art will realize that even though specific numbers of devices such as screws or bolts are shown in the figures, that in other embodiments different numbers (e.g., less or more) of the same device may be used. A person of ordinary skill in the art will also realize that even though specific devices such as fastening devices (e.g., bolts) are shown in the figures that other devices may be used as fastening devices. For example, in one embodiment one screw may be used to attach the fabric table 7 to the post arm 3 rather than the two screws 65 shown in FIG. 8.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

The invention claimed is:

1. A method comprising the steps of:
providing a welding machine comprising a welding machine body, a welding arm with an end extending away from the welding machine body, a first roller rotatably mounted on the welding arm end, a swing arm pivotally attached to the welding machine body, a second roller rotatably mounted on the swing arm adjacent the first roller, a bracket attached to the swing arm, and a heat system;
moving the swing arm pivotally to a first position;
mounting the swing arm in the first position by connecting the bracket to the welding machine body at a first location so that the welding machine is configured to weld fabric with the heat system and rollers while the swing arm is mounted in the first position;
disconnecting the bracket from the first location;
moving the swing arm pivotally to a second position;
mounting the swing arm in the second position by connecting the bracket to the welding machine body at a second location so that the welding machine is configured to weld fabric with the heat system and rollers while the swing arm is mounted in the second position and the bracket is disconnected from the first location.

2. The method of claim 1 wherein the bracket is pivotally mounted on the swing arm.

3. The method of claim 1 wherein the swing arm is U-shaped and comprises a first arm, a second arm and a middle portion which extends from the first arm to the second arm so that the first and second arms form sides of the U-shape and the middle portion forms a bottom of the U-shape.

4. The method of claim 3 wherein the swing arm pivots about an axis which is parallel to the middle portion.

5. The method of claim 3 wherein the middle portion is horizontal in the first position and second position.

6. The method of claim 3 wherein the swing arm pivots about an axis;
the first arm has a first end adjacent the axis and a second end distal the axis;
the second arm has a first end adjacent the axis and a second end distal the axis; and the middle portion extends from adjacent the second end of the first arm to adjacent the second end of the second arm.

7. The method of claim 6 wherein the second roller is adjacent the first end of the second arm.

8. The method of claim 3 wherein the first arm is between the second arm and the welding machine body.

9. The method of claim 8 wherein the second roller is rotatably mounted on the second arm; and
the bracket is between the first arm and the welding machine body.

10. The method of claim 1 further comprising the steps of pivoting the swing arm about an axis; and rotating the second roller about the axis.

11. A method comprising the steps of:
providing a welding machine comprising a welding machine body, a welding arm with an end extending away from the welding machine body, a first roller rotatably mounted on the welding arm end, a swing arm pivotally attached to the welding machine body to pivot about an axis, a second roller rotatably mounted on the swing arm adjacent the first roller, and a heat system; wherein the swing arm is U-shaped and comprises a first arm, a second arm and a middle portion which extends from the first arm to the second arm so that the first and second arms form sides of the U-shape and the middle portion forms a bottom of the U-shape; the first arm has a first end adjacent the axis and a second end distal the axis; the second arm has a first end adjacent the axis and a second end distal the axis; and the middle portion extends from adjacent the second end of the first arm to adjacent the second end of the second arm;
moving the swing arm pivotally about the axis to a first position so that the welding machine is configured to weld fabric with the heat system and rollers while the swing arm is in the first position; and
moving the swing arm pivotally about the axis to a second position so that the welding machine is configured to weld fabric with the heat system and rollers while the swing arm is in the second position.

12. The method of claim 11 wherein the axis is parallel to the middle portion.

13. The method of claim 11 wherein the middle portion is horizontal in the first position and second position.

14. The method of claim 11 wherein the second roller is adjacent the first end of the second arm.

15. The method of claim 11 wherein the first arm is between the second arm and the welding machine body.

16. A method comprising the steps of:
providing a welding machine comprising a welding machine body, a welding arm with an end extending away from the welding machine body, a first roller rotatably mounted on the welding arm end, a swing arm pivotally attached to the welding machine body, a second roller rotatably mounted on the swing arm adjacent the first roller, and a heat system;
moving the swing arm pivotally to a first position;
attaching a fabric table to the machine body while the swing arm is in the first position so that the welding machine is configured to weld fabric with the heat system and rollers while the swing arm is in the first position and the fabric table is attached to the machine body;
detaching the fabric table from the machine body; and
moving the swing arm pivotally to a second position so that the welding machine is configured to weld fabric with the heat system and rollers while the swing arm is in the second position and the fabric table is detached from the machine body.

17. The method of claim 16 wherein the step of attaching comprises attaching the fabric table to the swing arm; and the step of detaching comprises detaching the fabric table from the swing arm.

18. The method of claim 16 further comprising at least one of the steps of (a) welding fabric with the heat system and rollers while the swing arm is in the first position and the fabric table is attached to the machine body; and (b) welding fabric with the heat system and rollers while the swing arm is in the second position and the fabric table is detached from the machine body.

19. The method of claim 18 further comprising both of the steps of welding fabric with the heat system and rollers while the swing arm is in the first position and the fabric table is attached to the machine body; and welding fabric with the heat system and rollers while the swing arm is in the second position and the fabric table is detached from the machine body.

20. The method of claim 16 wherein the swing arm is U-shaped.

* * * * *